Nov. 3, 1936.    C. A. SCHELLENS    2,059,612
GEARING
Filed July 12, 1932    2 Sheets-Sheet 1

Inventor.
Christopher A. Schellens
by ⸻ ⸻ atty

Nov. 3, 1936.     C. A. SCHELLENS     2,059,612
GEARING
Filed July 12, 1932     2 Sheets-Sheet 2

Inventor,
Christopher A. Schellens

Patented Nov. 3, 1936

2,059,612

UNITED STATES PATENT OFFICE 2,059,612

GEARING

Christopher A. Schellens, Marblehead, Mass.

Application July 12, 1932, Serial No. 622,084

27 Claims. (Cl. 74—466)

This invention relates to improvements in gears and in particular although not restricted to gears for transmitting large powers, in which the small gear or pinion is of relatively small diameter and is operated at high speed and has a large face width to transmit large power.

It has been found that in gears of this type, of which the herringbone gear is an example, great accuracy in the relative axial alignment of gear and pinion is necessary in order to prevent excessive wear and even breakage, particularly when the pitch line speed is relatively high, since a small misalignment of the axes will destroy the uniform distribution of tooth pressure per inch of face along the line of contact.

It is one of the objects of my invention to provide a form of tooth which will permit of a small misalignment of the axes, such as might be encountered in the commercial manufacture and use of the gear, without substantially disturbing the uniform distribution of tooth pressure per inch of face.

It has also been found that the twist occurring in the pinion due to the load on the teeth produces an effect substantially similar to the misalignment of the axes and it is a further object of my invention to overcome this difficulty in the same manner.

One of the features of my invention lies in the provision for properly maintaining the contact of the teeth along the tooth face by means of the tooth form itself, without the provision of movable pinion bearings. In this way it is possible to adjust the pinion bearings so that the pinion shaft will be aligned with its driving shaft, since it is not necessary to pay much attention to the relative alignment of pinion and gear.

How the foregoing, together with other objects and advantages as may hereinafter appear, or are incident to my invention are realized is illustrated in the accompanying drawings, wherein.

Figure 4:
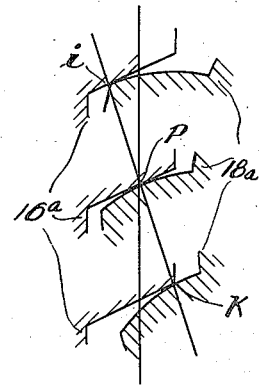
Figure 3:
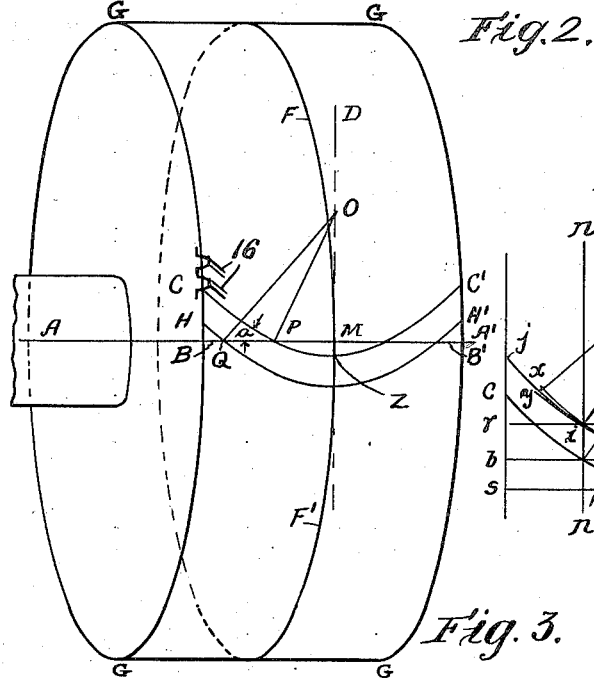
Figure 5:
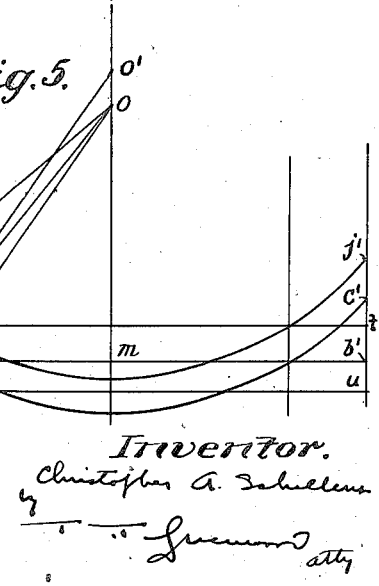

Figs. 3, 4, and 5 are geometrical diagrams illustrating the principles involved in my invention as will appear hereinafter.

Figure 1:
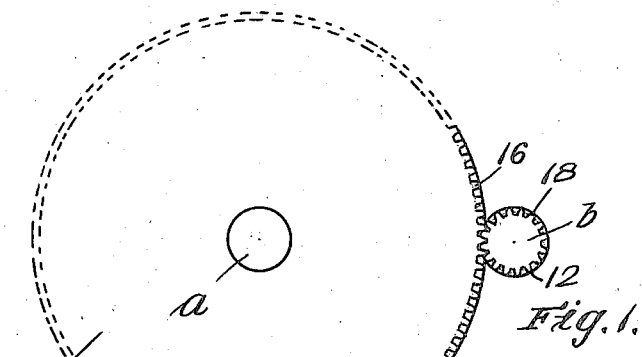
Fig. 1 is an end view of a pair of gears embodying the present invention.
Figure 6:
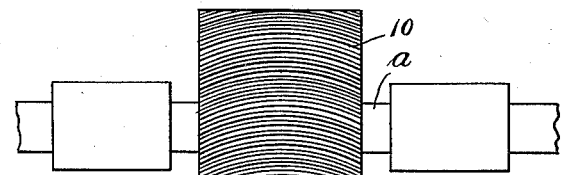

Fig. 6 is a plan view of the gear set of Fig. 1 illustrating the manner of supporting the pinion shaft free for displacement axially thereof.

Figure 7:
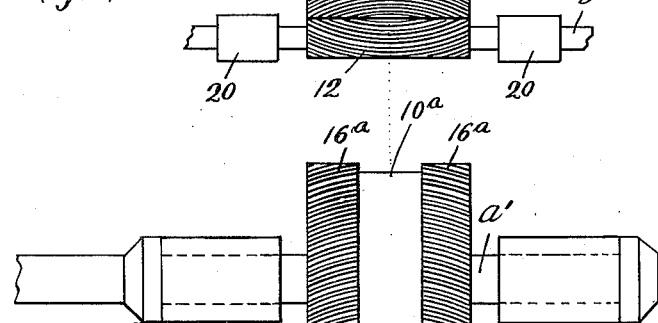

Fig. 7 is a view similar to Fig. 6 but illustrating a modified construction wherein the continuity of the gear teeth is interrupted in the longitudinal middle thereof.

Figure 8:
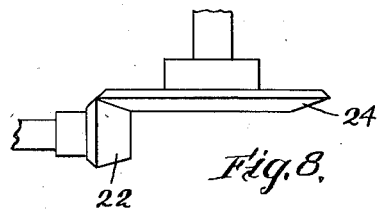

Fig. 8 is a plan view of a pair of mating bevel gears.

Figure 9:
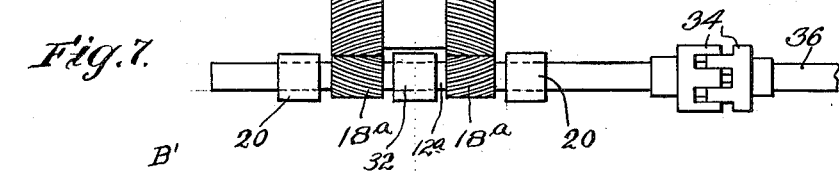
Figure 9:
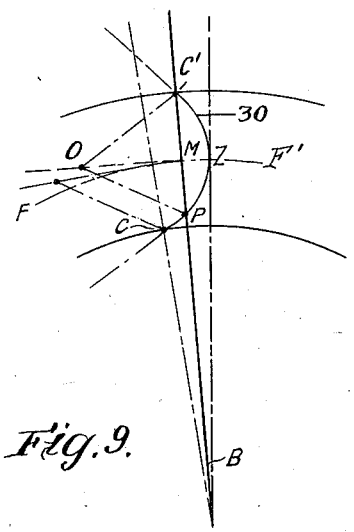

Fig. 9 is a diagram showing the development on the pitch cone of the pitch line of a bevel gear tooth of Fig. 8.

Figure 10:
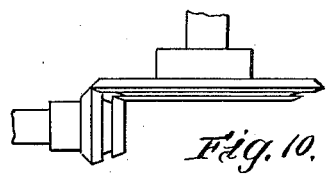

Fig. 10 is a view of a bevel gear set similar to Fig. 8 but illustrating a construction wherein the continuity of the teeth is interrupted in the longitudinal middle thereof.

My invention is here shown as applied to the large driven gear 10 fixed to its shaft $a$ and meshing with a driving pinion 12 having a shaft $b$. The shaft $b$ is so mounted in bearings 20, see especially Fig. 6, that it is free for displacement in an axial direction under pressure of the mating teeth 16 and 18 of the gear and pinion due to an angular displacement of the axes thereof and to such an extent as to preserve the uniform distribution of tooth pressure that is obtained by the tooth form of the present invention.

Figure 2:
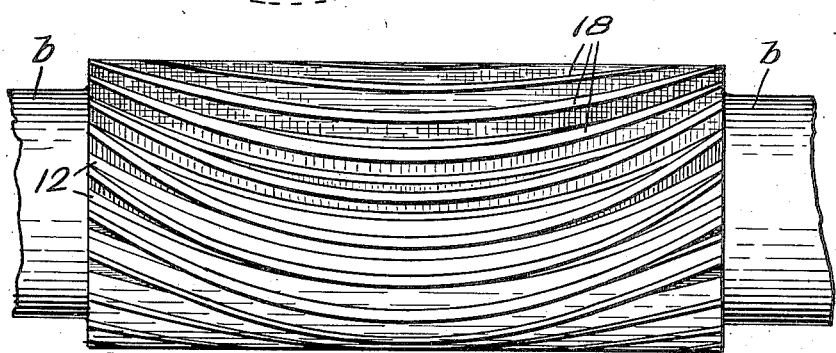
Fig. 2 is a front elevation of a pinion constructed in accordance with my invention and especially illustrating the shape of the teeth.

In accordance with the present invention each gear tooth 16 and 18, see especially Fig. 2, extends along the face in a helix of gradually changing angle, the angle changing from a positive to a negative value gradually from one end of the gear to the other, although in some instances, the changing angle may have an entirely positive, or an entirely negative value. The particular gears herein illustrated have their pitch surfaces in the form of circular cylinders, but my invention contemplates gears having other forms of pitch surfaces, such as cones for example, as required for bevel gears. Figs. 8 and 9 illustrate the invention applied to a set of bevel gears.

The teeth 16 and 18 are preferably of involute form as illustrated in Fig. 1 and, in the particular case shown, the sections of the gear at all points of the axis are substantially the same.

The principle of the invention is best developed in Fig. 3. In this figure, surface GGGGBB¹ represents the pitch surface of a gear 10 having the shaft axis AA¹. This surface is again shown for convenience as a circular cylinder. Line BB¹ represents an element of the surface. Line CC¹ represents the intersection of the pitch cylinder with one side of the tooth section. Line FF¹ is the intersection of the pitch surface with a plane perpendicular to the axis AA¹, preferably, but not necessarily, midway between the two end planes of the gear. FF¹ intersects BB¹ at M. DM is a line tangent to FF¹ at M, and is therefore perpendicular to BB¹. CC¹ intersects BB¹ at some point P. $a$ represents the angle CPB at P.

My invention is characterized by constructing the tooth pitch-line curve $CC^1$ substantially of such form that $\tan a = K \times PM$, where K is a constant.

Obviously K must be the same for both gear 10 and meshing pinion 12, and position of plane $FMF^1$ along axis $AA^1$ must be such that curves $FMF^1$ for gear and meshing pinion make contact with each other.

Now if OP is drawn normal to curve $CPC^1$ at P and intersects line DM at O $$\frac{PM}{OM} = \tan a$$

Therefore $$OM = \frac{1}{K}$$

Now $HH^1$ represents another curve on the pitch cylinder having the same K and the same central line $FMF^1$, and intersecting $BB^1$ at Q. If we draw the normal to the curve $HH^1$ at Q intersecting DM it is obvious that the point of intersection will again be O.

The principles involved in my invention may now be understood if we assume the element $BB^1$ to be the line of contact of the two pitch surfaces of gear and meshing pinion. At point P, therefore, the meshing gear and pinion tooth will be in pitch line contact. It is evident that if the pinion axis be rotated through a small angle about an axis through O perpendicular to plane OMB:

Point P on the pinion will remain on curve $CC^1$ of the gear. Corresponding point Q of another tooth, or of the same tooth at a different instant, will remain on the corresponding curve $HH^1$ of the gear.

In other words, for a small rotation of the pinion element $BB^1$ in the plane OMB and about O, teeth in contact near their pitch line will remain in contact. It is evident that, since a general misalignment of the pinion element $BB^1$ in the plane OMB can be accomplished by a rotation of the pinion axis about an axis perpendicular to OMB through O, a displacement of the pinion along its axis and a rotation of the pinion about its axis, the tooth pressures will shift the pinion along its axis when the axis is in any way thrown out of line in a plane parallel to the plane OMB, and teeth in contact near their pitch line will remain in contact.

In the case where the surface $GGGGBB^1$ is a cylinder the developed longitudinal pitch line curve $CC^1$ can be shown to be a parabola of the second degree, having the focal distance equal to OM/2 and characterized by the equation $$(MP)^2 = 2(OM) \times (MZ).$$

It should be noted that the substantially perfect contact of the teeth in the face of a small misalignment of axes has particular reference to meshing points which make contact near their pitch lines. Consider now Fig. 5 in which the plane of the paper represents the pitch plane of a rack, selected for simplicity of discussion. Let points $b$, $b^1$, $c$, $c^1$, $o$, $p$, $m$, correspond to points B, $B^1$, C, $C^1$, O, P, M, respectively in Fig. 3. It is apparent that contact is not in general restricted to points on the line $bb^1$ but takes place over an area which projects at $rsut$, where $rs$ is the projected length of contact of the tooth sections, and is commonly made equal in length to one and one-half tooth pitches more or less.

Fig. 4 represents a section at $nn^1$ showing positions of meshing pinion and rack teeth $18a$ and $16a$ respectively at limits of contact, points $i$ and $k$, and pitch line contact, point P.

In Fig. 5 consider the intersection of a plane parallel to the plane of the paper through point $i$ with the rack tooth flank, which intersection is shown projected on the plane of the paper by the curve $jj^1$ which is the same curve as $cc^1$, displaced in the direction and amount $rb$. The normal to this curve at $i$ intersects the line $om$ at $o^1$, and $oo^1$ is equal to $rb$. If the pinion axis is rotated about an axis perpendicular to the plane of the paper through $o$ as required for maintaining tooth contact of point $p$, by the amount of the angle $\phi$, point $i$ on the pinion will interfere with line $jj^1$ by the amount $xy$, where $ix$ is perpendicular to $oi$ and $iy$ perpendicular to $o'i$. As shown in Fig. 5, angle $\phi$ which represents the angle of misalignment of the pinion axis, has been greatly magnified in comparison to any angular displacement of the axis likely to occur in practice, with the purpose of making $xy$ of visible magnitude.

It can be shown that for small values of $\phi$ and $rb$, $$xy = rb \times \frac{pm}{op} \times \phi$$

where $\phi$ is measured in radians. In the same way it can be shown that at $k$, the other limit of the line of contact, there would be a clearance of amount $sb \times pm/op \times \phi$. If instead of an interference at $i$, contact is just maintained, which can be accomplished by a slight rotation of the pinion about its axis, the total clearance at $k$ would be the sum of the above mentioned interference and clearance, namely $rs \times pm/op \times \phi$. This is a maximum at the two ends of the gear face.

This maximum clearance is of very small magnitude as will appear from the following example of a typical gear and pinion in accordance with my invention, and having the following dimensions:

|  | Inches |
| --- | --- |
| Pitch of tooth | .75 |
| Length of face | 16 |
| OM | 10 |
| RS | 1.25 |

Assume that one end of the pinion is moved out of alignment .01 inch in a direction perpendicular to the plane of the two axes. Then the angle $\phi$ as set forth above would be .01/16 and the maximum clearance would be $$.01/16 \times 1.25 \times \frac{8}{12.8}$$

or .00049 in.

This clearance is to be compared with a clearance of .01 inch which would exist in the case of a straight spur gear of 16 inch face width, and with a clearance of .0043 inch which would occur in the case of a double herringbone gear of 16 inch total face and 30° helix angle, both under similar conditions to the above.

Figs. 8 and 9 illustrate the invention applied to bevel gears wherein the small pinion gear 22 meshes with the large gear 24. In Fig. 9 the curve 30 represents the developed pitch line curve of a tooth. Comparing this curve with the curve of Fig. 3 it is to be noted that the former is not symmetrical about the developed center line $FF^1$ of the curve. That is to say, on the tangent line $BB^1$ of the pitch surface PM is less than $MC^1$ and the curve from P to Z is flatter than from $C^1$ to Z. The requirement for automatic alignment, namely that the normals to curve 30 at the points P and C¹ meet at a common point O on the tangent MO to the center line FF¹ is satisfied.

It has been shown above that in a meshing gear and pinion constructed in accordance with my invention substantially perfect tooth contact is maintained regardless of a small misalignment of the pinion axis in a plane perpendicular to the two axes. This same advantage, however, applies in the case of misalignment of the pinion axis in other planes as will be apparent from an inspection of Fig. 4. It is evident that the section of the pinion can be displaced in a direction perpendicular to the line of contact $i$, $k$ by a small amount without disturbing the contact of the teeth. If the teeth are of involute form, and have the same pressure angle at different sections perpendicular to the pinion axis along its length, for a cylindrical gear or, stated more generally, perpendicular to an element of the pitch surface, as contemplated in my invention, the surface of contact is a plane. A small displacement, including both translation and rotation, of the pinion axis in a plane perpendicular to this plane of contact, would therefore, not disturb the tooth contact.

It is apparent therefore that since the contact of the teeth is maintained in the face of misalignments of the pinion axis in two different planes, the same applies to misalignments in all other planes as the motions can be resolved into motions in the two specific planes above mentioned.

The distance OM in Fig. 3 is arbitrarily chosen. If it is unduly long the tooth curve CC¹ will be flatter than is desired for some purposes and, if it is unduly short, the entrance helix angle of CC¹, or the angle that an element of the pitch surface at the end of the gear makes with the side face of the gear will be too steep for convenient manufacture.

While the plane FMF¹ has been described as located in the center of the gear and pinion, which is desirable for the gear and pinion described, for balanced axial thrust, the plane can be located elsewhere if special results are desired or special conditions are present. The plane FMF¹ can be at or beyond one face of the gear and pinion if such a position should be desirable. Ordinarily, however, the present showing is preferred.

While I have described my invention in a preferred form in which the gear face is continuous, it is apparent that the same principles apply if a portion of the tooth face between two planes perpendicular to the axis is removed, or if the gear structure is composed of two co-axially mounted gears having a common pitch surface. It is furthermore not necessary for the fulfillment of the principles involved in my invention that the teeth of one portion of the face thus divided are continuous with those of the other portion, but they may be displaced circumferentially relatively to those of said other portion. In such a structure it is possible to mount an additional pinion-journal bearing between the two portions of the pinion face. I wish to have this feature of my invention construed broadly. Fig. 7 illustrates a construction wherein the middle portion of the gear teeth 16a and 18a of the gear and pinion 10a and 12a respectively have been removed and a bearing 32 for the pinion shaft is located between the separated positions of the pinion faces. In this figure also is shown a coupling 34 which connects the pinion shaft with a drive shaft 36, which may be a turbine shaft, and permits movement of the pinion shaft lengthwise of its axis. The gear shaft $a^1$ is held from movement axially.

I am aware that for the service as set forth above different types of gears, particularly those of the double herringbone type are giving satisfactory service. However, since misalignments must in general occur in many of them, due to a number of causes such as error in initial assembly, distortion of gear casing by heat or by external forces, twist of the pinion due to the load on the teeth, etc., only a comparatively light tooth pressure can safely be carried by these gears. In a gear constructed in accordance with my invention a higher tooth pressure per inch of face can be safely employed since the pressure is uniformly distributed, and therefore more power can be transmitted by a pinion of a given size. This is of great importance in the case of gears of high gear ratio since the diameter of the large gear must increase in proportion to that of the pinion, and the large gears are frequently of very large dimensions. It is also true that the smaller the pinion the smaller may be the pitch line speed, and hence the effects of noise and wear are correspondingly reduced. My invention therefore constitutes a valuable improvement in the art.

In a gear as contemplated in my invention the interferences and clearances as calculated above, when perfect contact is maintained on the pitch surfaces, are a maximum at the ends of the faces and decrease to zero at the center. Furthermore it is to be noted that they take place at the ends of the teeth only, where the relative sliding velocity is at a maximum. The small volume of metal in interference would therefore tend to wear away leaving the points near the pitch circle in perfect contact.

I may prefer to grind in two meshing gears by running them together with an abrasive, and deliberately throwing the axes out of line in a plurality of positions. Such gears would subsequently maintain practically perfect contact of the teeth in the face of severe misalignment of the axes in any direction.

It will be apparent that in gears of any form other than that contemplated by my invention removal of metal on the pitch surfaces is necessary in order to effect contacting of the teeth under misalignment of the axes. Since there is no relative sliding at the pitch surfaces, wearing or grinding in of the teeth is slow. Furthermore, after a gear has been worn or ground in to perfect tooth contact, with a given misalignment of axes, contacting applies to the particular misalignment only. In the case of an equal misalignment in the opposite direction double the amount of metal would have to be removed to again secure perfect contacting. Therefore where the misalignment is of a variable nature the gear will not wear itself in nor can it be ground in. On the contrary, in a gear in accordance with my invention, the tooth faces can be ground in on all their interference regions and the desired contact subsequently obtained regardless of misalignments of variable direction and amount.

I may also prefer to relieve the ends of the teeth, or to make the addendum relatively small, thereby making the line of contact very short or reducing it to a point. In this way I would secure substantially pure longitudinally rolling contact of the teeth, and tooth contact in the face of misalignment likely to occur in practice would be substantially perfect.

I claim:

1. A pair of mating gears that are adapted to have their axes angularly displaced by a small amount in any direction, said gears having teeth that have line contact and such longitudinal curvature that the length of the line of contact remains substantially the same but shifts axially upon said angular displacement of the gear axes, said longitudinal curvature being a parabola, and means for mounting said gears for relative axial displacement of their axes in response to angular displacement of their axes.

2. A pair of mating gears that are adapted to have their axes angularly displaced by a small amount in any direction, said gears having teeth of such longitudinal curvature and tooth form that the distribution of pressure per unit length of tooth face remains substantially unchanged regardless of said angular displacement of said gear axes, said longitudinal curvature being a parabola, and means for mounting said gears for relative axial displacement of their axes in response to angular displacement of their axes.

3. A pair of mating gears that are adapted to have their axes angularly displaced by a small amount in any direction and means for mounting said gears for relative axial displacement of their axes in response to said angular displacement of their axes, said gears having teeth that have progressive line contact and have such longitudinal curvature and tooth profile that the length of such line contact is maintained regardless of said angular displacement of the gear axes, said longitudinal curvature being a parabola.

4. A pair of mating gears that are adapted to have their axes angularly displaced by a small amount in any direction and means for mounting said gears for relative axial displacement of their axes in response to said angular displacement of their axes, said gears having teeth that have progressive line contact and have such longitudinal curvature that the length of such line contact is substantially maintained regardless of said angular displacement of the gear axes, said longitudinal curvature being a parabola, and said teeth having an involute cross-section of a constant pressure angle in all sections perpendicular to the gear axis.

5. A helical gear having gear teeth having a longitudinal curvature which is a parabola of the second degree.

6. A gear of cylindrical pitch surface having teeth of such form that the developed intersection of the pitch surface with the tooth surface is a parabola of the second degree, having its axis perpendicular to an element of the pitch cylinder.

7. A gear of cylindrical pitch surface having teeth of such form that the developed intersection of the pitch surface with the tooth surface is a parabola of the second degree, having its axis perpendicular to an element of the pitch cylinder, said teeth having an involute section of the same pressure angle in any plane perpendicular to the axis.

8. A pair of separated coaxially mounted gears having a common cylindrical pitch surface, and having teeth of such form that the developed intersections of the pitch surface with the tooth surfaces are parabolas of the second degree, having a common axis perpendicular to an element of the pitch cylinder, and located intermediate between the two gears, said parabolas having a common focal distance.

9. A plurality of meshing gears of cylindrical pitch surface having teeth of such form that the developed intersection of the pitch surface with the tooth surface is a parabola of the second degree, having its axis perpendicular to an element of its pitch cylinder.

10. A gear having teeth of such form that the intersection of the pitch surface of the gear with any tooth flank forms a curve, said curve being characterized by having the tangent of the angle which it makes with an intersecting element of the pitch surface proportional to the distance of the point of intersection from the point of intersection of said element with a single plane perpendicular to the gear axis.

11. A gear having teeth of such form that the intersection of the pitch surface of the gear with any tooth flank forms a curve, said curve being characterized by having the tangent of the angle which it makes with an intersecting element of the pitch surface proportional to the distance of the point of intersection from the point of intersection of said element with a single plane perpendicular to the gear axis, said gear having teeth of substantially involute cross-section of the same pressure angle in any plane perpendicular to an element of its pitch surface.

12. A gear having teeth of such form that the intersection of the pitch surface of the gear with any tooth flank forms a curve, said curve being characterized by having the tangent of the angle which it makes with an intersecting element of the pitch surface proportional to the distance of the point of intersection from the point of intersection of said element with a single plane perpendicular to the gear axis, and a second gear having teeth of the same characteristics meshing therewith.

13. A pair of separated coaxially mounted gears having a common pitch surface and having teeth of such form that the intersections of the common pitch surface with a side of any tooth forms a curve, said curve being characterized by having the tangent of the angle which it makes with an intersecting element of the pitch surface proportional to the distance of the point of intersection from the point of intersection of said element with a single plane which is perpendicular to the gear axis, said plane being positioned between the two gears.

14. A gear having teeth of such form that the intersection of the pitch surface of the gear with a side of any tooth forms a curve, said curve being characterized by having the tangent of the angle which it makes with an intersecting element of the pitch surface proportional to the distance of the point of intersection from the point of intersection of said element with a single plane perpendicular to the gear axis, said gear having substantially involute shaped teeth of the same pressure angle in sections formed by all planes perpendicular to an element of its pitch surface, and a second gear having teeth of the same characteristics meshing therewith, and means for mounting said second gear for free displacement along its axis relative to said first gear.

15. A pair of mating gears, and means for mounting them for relative axial displacement of their axes in response to angular displacement of said axes, said gears having teeth of such longitudinal curvature and such tooth profile that they will contact at all points on the tooth pitch line when both said axes are parallel and also when said axes are displaced by a small amount in any direction, said longitudinal curvature being a parabola.

16. A pair of mating gears having a ratio of face width to circular pitch upwards of 12, and means for supporting said gears so that one of them is free for axial displacement in response to relative angular displacement of the gear axes, said gears having teeth of such continuously variable lengthwise curvature that combined with the freedom of one of the gears to shift axially the contact of said teeth is insensitive to a small angular displacement of one of said gears in a plane perpendicular to the normal plane including the gear axes, said lengthwise curvature comprising a parabola.

17. In a helical pinion having a ratio of face width to pitch diameter upwards of 2, teeth of continuously variable helix angle changing from a positive value at one end of the face, through a zero value at an intermediate point, to a negative value at the other end of the face, whereby satisfactory contact of the teeth with a mating gear is maintained in spite of a misalignment of the pinion axis.

18. In a helical gear having a ratio of face width to pitch diameter upwards of 2, teeth of continuously variable longitudinal curvature, the said curvature being characterized by being relatively small at points near the ends of the face and relatively large at points near the center of the face.

19. A pair of meshing gears subject to relative angular displacement of their axes, means for mounting said gears for relative displacement axially of their axes in response to angular displacement of their axes, said gears having tooth flank surfaces which are so defined that, at any point of a single specific line extending along substantially the total active width of the tooth and lying within the active portion of a flank, when said point is in meshing contact, the flank surface is normal to a line joining said point with a single specific point.

20. In a helical gear having a ratio of face width to circular pitch upwards of 12, teeth of continuously variable helix angle, changing from a positive value at one end of the face, through a zero angle at an intermediate point, to a negative value at the other end of the face.

21. A curved tooth gear, the curvature of whose teeth is such that the intersection of a tooth flank with the pitch surface of said gear when developed on said pitch surface is a parabola of the second degree, the helix angle at the end of either face being between 25 and 45 degrees.

22. A curved tooth gear, the curvature of whose teeth is such that the intersection of a tooth flank with the pitch surface of said gear when developed on said pitch surface is a parabola of the second degree, the helix angle at the end of either face being between 25 and 45 degrees, the tooth profiles of said teeth being involutes of a constant pressure angle for all sections perpendicular to the gear axis.

23. A bevel gear having teeth of such form that the intersection of the pitch surface of the gear with any tooth flank forms a curve, said curve being characterized by having the tangent of the angle which it makes with an intersecting element of the pitch surface proportional to the distance of the point of intersection from the point of intersection of said element with a single plane perpendicular to the gear axis.

24. A gear of cylindrical pitch surface comprising the two zones adjacent the face ends of a curved tooth gear having teeth of continually variable helix angle, said angle changing from a positive value at one end of the face, through a zero value at an intermediate point, to a negative value at the other end of the face, a zone of the face of said curved tooth gear intermediate of the said two zones being absent.

25. A bevel gear comprising the two zones adjacent the face ends of a curved tooth gear having teeth of continually variable helix angle, said angle changing from a positive value at one end of the face, through a zero value at an intermediate point, to a negative value at the other end of the face, a zone of said curved tooth gear intermediate of the said two zones being absent.

26. A pair of mating gears of cylindrical pitch surface having teeth of such form that the length of the line of contact of the mating teeth is maintained substantially constant irrespective of small angular displacements of the gear axes in any direction, means for mounting said gears for relative axial displacement of their axes in response to relative angular displacement of their axes, the tooth form being such that the developed intersection of the pitch surface with the tooth surface is a parabola having its axis perpendicular to an element of the cylinder.

27. A plurality of meshing gears, said gears having teeth of such form that the length of the line of contact of the mating teeth of said gears is maintained substantially constant irrespective of small angular displacement of the gear axes in any direction, said tooth form being such that the developed intersection of the pitch surface with the tooth surface is a parabola having its axis perpendicular to an element of the pitch surface, and means for mounting one of said gears for displacement along its axis relatively to the other gear in response to relative angular displacement of the gear axes.

CHRISTOPHER A. SCHELLENS.